United States Patent [19]

Lee, Jr. et al.

[11] Patent Number: 5,411,196
[45] Date of Patent: May 2, 1995

[54] ARTICLE CARRIER

[75] Inventors: James A. Lee, Jr., Warren; Douglas L. Wickham, Troy; Gregory L. Eilers, Royal Oak; William D. Batterson, Grand Blanc; Craig A. Stapleton, Rochester Hills, all of Mich.

[73] Assignee: Masco/Tech, Inc., Taylor, Mich.

[21] Appl. No.: 124,984

[22] Filed: Sep. 21, 1993

[51] Int. Cl.⁶ ............................................. B60R 9/045
[52] U.S. Cl. ..................................... 224/321; 224/315
[58] Field of Search ............... 224/309, 310, 315, 317, 224/321, 323, 324, 325, 326, 917; 248/503; 211/100

[56] References Cited

U.S. PATENT DOCUMENTS

| | | |
|---|---|---|
| Re. 26,539 | 3/1969 | Bott . |
| Re. 32,583 | 1/1988 | Bott . |
| 2,833,453 | 5/1958 | Barreca . |
| 3,223,302 | 12/1965 | Helm . |
| 3,239,115 | 3/1966 | Bott et al. . |
| 3,241,501 | 3/1966 | Watts ................................ 224/321 |
| 3,610,491 | 10/1971 | Bott . |
| 3,848,785 | 11/1974 | Bott ................................ 224/319 |
| 4,099,658 | 7/1978 | Bott . |
| 4,133,465 | 1/1979 | Bott . |
| 4,182,471 | 1/1980 | Bott . |
| 4,239,139 | 12/1980 | Bott . |
| 4,295,587 | 10/1981 | Bott . |
| 4,295,588 | 10/1981 | Kowalski et al. . |
| 4,427,141 | 1/1984 | Bott . |
| 4,431,123 | 2/1984 | Bott . |
| 4,440,333 | 4/1984 | Bott . |
| 4,497,424 | 2/1985 | Möbius ............................. 224/324 |
| 4,516,709 | 5/1985 | Bott . |
| 4,516,710 | 5/1985 | Bott . |
| 4,728,019 | 3/1988 | Olliges ............................. 224/323 |
| 4,930,671 | 6/1990 | Tittel ................................ 224/315 |
| 5,139,375 | 8/1992 | Franchuk ........................ 248/503 |

FOREIGN PATENT DOCUMENTS

| | | | |
|---|---|---|---|
| 246658 | 3/1963 | Australia ........................... 224/325 |
| 2376013 | 7/1978 | France ............................. 224/324 |
| 3805930 | 9/1989 | Germany ......................... 224/326 |
| 2054495 | 2/1981 | United Kingdom ............. 224/323 |

Primary Examiner—Henry J. Recla
Assistant Examiner—Gregory M. Vidovich
Attorney, Agent, or Firm—Brooks & Kushman

[57] ABSTRACT

An article carrier includes spaced longitudinal rails, at least one of the rails having an upper arm coupled by a hinge to a lower arm. A crossbar having an end portion adapted to be entrained between the upper and lower arm portions includes a conformingly shaped mating surface to one of the members of the longitudinal rail. Preferably, both ends of each crossbar include conforming surfaces that mate with corresponding configurations on the rail to fixedly position the crossbar along the longitudinal rail. The position of the crossbar is easily adjusted by opening the upper member of the longitudinal rail by displacement about the hinge, and the hinge axis may be transversely, longitudinally or vertically aligned as desired. Preferably, two upper arms are provided on a longitudinal rail and supported by hinges located at opposite ends of the longitudinal rail. The opposite ends of the two upper arms include overlapping portions which can be retained by a single latch mechanism. The upper arms are closed to a spaced apart position from the lower member of the longitudinal rail. The fixed positioning of the crossbars permits additional accessories such as a locking grid to be movably entrained between the longitudinal rails. In addition, the article carrier may include a retainer arm which locks to the grid and between the upper arm and lower arm of a longitudinal rail.

17 Claims, 5 Drawing Sheets

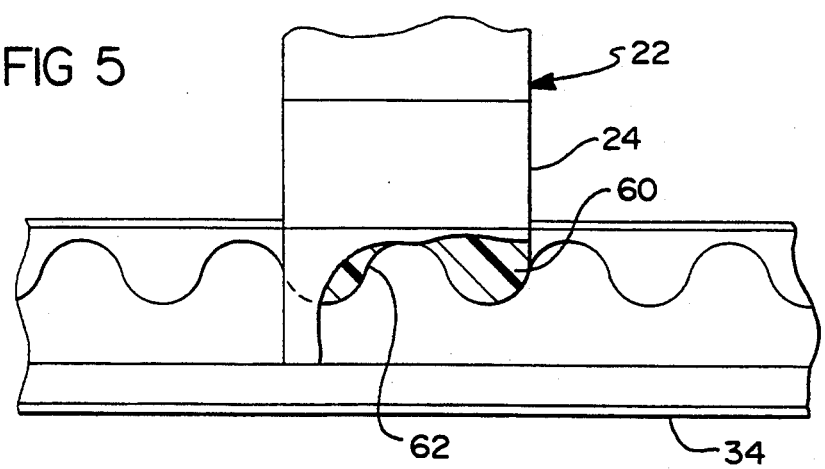
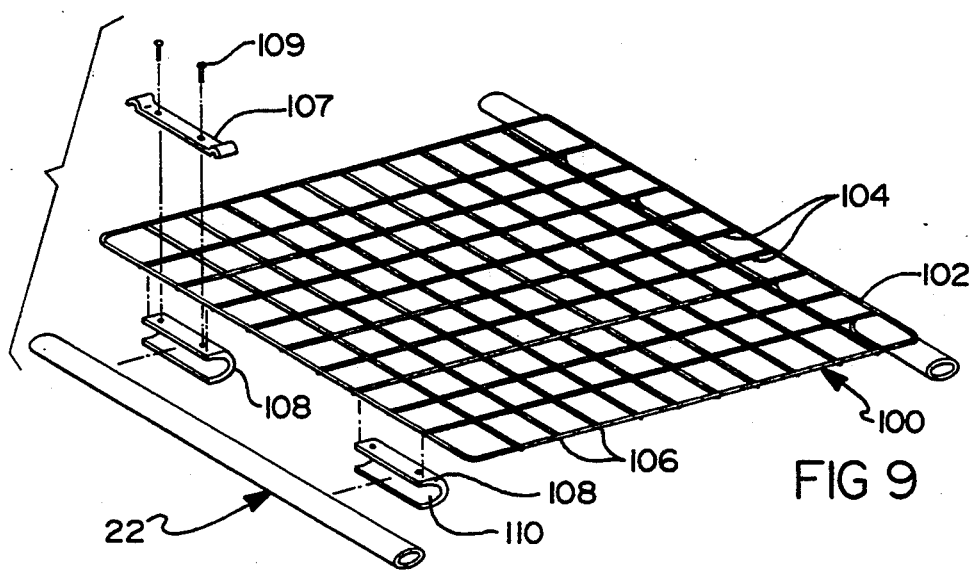
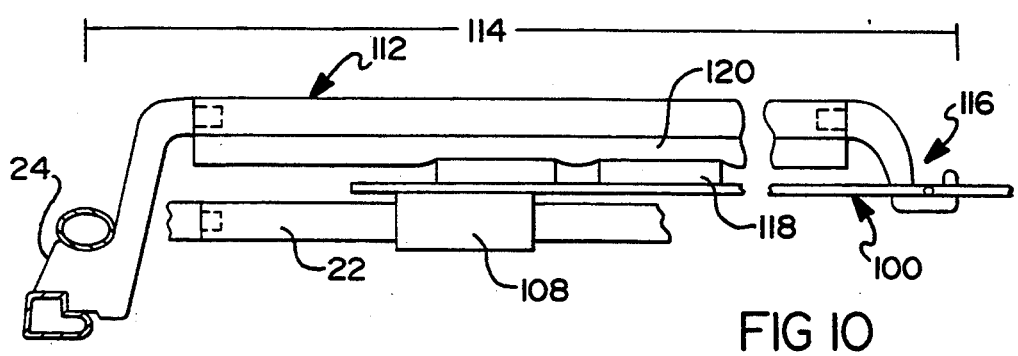

ARTICLE CARRIER

FIELD OF THE INVENTION

The present invention relates generally to article carriers mounting on motor vehicle body panels, and more particularly to article carriers having releasably locking crossbars extending between the rails.

BACKGROUND ART

Motor vehicle article carriers have long been known to be useful for increasing the cargo capacity of motor vehicles. Generally, the carriers comprise rigid bars which are mounted to and supported above a vehicle body panel to provide a solid support that does not deform the finished body panel, and avoids abrasive contact between the cargo and the vehicle body panel. However, many of the previously known article carriers were rigid structures which could not be adjusted to fit differently sized articles or parcels, and the parcels had to be strapped or otherwise tied to the article carrier in order to maintain the articles in position as the vehicles objected to movement of the vehicle and environmental conditions.

One previously known improvement for retaining articles in a fixed position on the article carrier was to provide crossbars extending between longitudinal rails, the crossbars being constructed as clamps to grip and hold articles in a fixed position on the carrier. In particular, some previously known carriers particularly adapted for carrying skis include upper arms pivotally connected to lower arms of the crossbars so that they can be pivoted up to receive a set of skis between padded layers on the upper and lower arms. The upper arms pivoted downwardly into pressing engagement with the ski and the lower arm member and the locking means clamps the upper arm in its compression position. However, such article carriers are particularly adapted for long relatively narrow structures, and are ill suited for a wide variety of cargo shapes and sizes.

Another previously known improvement in article carrying devices includes crossbars which were slidably received in elognated channels of longitudinal rail members. Typically, the crossbars include a clamping means such as cams or other locking members in order to retain the crossbar in a fixed position within the channel of the rail as desired. However, the open channels and the clamping members, including the particularly shaped surfaces or complex clamping elements, are exposed to environmental conditions and subject to the deforming, obstructive or corrosive effects of temperature, humidity, wind and debris. For example, ice accumulation could impede installation or movement of the crossbar within the channel.

SUMMARY OF THE INVENTION

The present invention overcomes the above-mentioned disadvantages by providing an article carrier in which displaceable crossbars have end portions received between upper and lower arms of spaced longitudinal rails. A hinge couples the upper arm to the lower arm of at least one rail. As used in the disclosure, the term rail is also to be understood as including a rail set in which the upper arm and lower arm are separately supported on a vehicle roof so long as a hinge or pivotal connection between the upper arm and the roof or support surface permits closure of the upper arm to its spaced, closed position over the lower arm. Complementary surfaces on the ends of the crossbar and a mating surface on an arm of the longitudinal rail define stabilized support positions for a crossbar along the longitudinal rail.

In a preferred embodiment, a longitudinal rail includes two upper arms, each arm being hinged at an opposite end of the rail to pivot about a traverse axis in an arc within a plane above the lower rail arm. The other end of each upper arm includes a latching end, preferably with overlapping arm portions at the center of the rail, whereby a single latch mechanism engaging one of the upper arms clamps both of the upper arms in their closed position. In one preferred embodiment, the complementary surface configurations include transverse corrugations in a surface of the lower rail and the lower mating surface of the end of the crossbar. The latching mechanism may include a lock, or a separate locking mechanism may be employed to restrict unlatching of the upper member and removal of the crossbar.

In another preferred embodiment of the invention, vertical protrusions and valleys, for example, sinuous corrugations, are provided on the mating surfaces of the rail arm and the end of the crossbar. Moreover, while one embodiment uses hinged upper arms on both longitudinal rails, an alternative embodiment employs the advantages of the present invention in an article carrier in which the hinged upper arm is carried by only one of the two longitudinal rails. Moreover, as is also disclosed in the present application, the hinge extending between the upper and lower member of the rail may have a hinge axis aligned longitudinally, vertically or transversely without departing from the present invention.

In another embodiment of the present invention, a grid may be carried between the crossbars by mounts adapted to engage the peripheral surface of the crossbars. Preferably, the grid is formed by a wire wall and is easily installed for ready access and use with the article carrier. Moreover, a retainer bar having an end portion with a complementary surface similar to the surface at the ends of the crossbar includes a body portion substantially shorter than the distance between the longitudinal rails. The other end portion includes a hook adapted to interengage the wires through an opening in the grid.

As a result, the present invention provides an article carrier with secure attachment of movable crossbars to longitudinal rails by clamping the crossbar ends between upper and lower members of the longitudinal rails. Moreover, the rails and the ends of the crossbar include mating surfaces with corresponding configurations that serve to secure the crossbar in a fixed position when engaged between the upper and lower members of the rail. Nevertheless, a hinged upper member of at least one rail is easily displaced from a particular spaced position over the lower member, to release the crossbar for free movement along the longitudinal rail. Moreover, the present invention provides an additional cargo clamp adapted to be carried by the article carrier while maintaining adjustability of the carrier for other cargo. Moreover, the present invention provides an article carrier in which the ends of the crossbar, as well as the supporting surfaces of the rails, are covered and protected by upper arms and the upper arms may be selectively displaced from engagement with the lower arm of the rail and the crossbars. Moreover, multiple arms can be used on each rail or on more than one rail to increase the adjustability of the crossbars positions along the longitudinal rails and the utility of the article carrier.

BRIEF DESCRIPTION OF THE DRAWING

The present invention will be more clearly understood by reference to the following detailed description when read in conjunction with the accompanying drawing in which like reference characters refer to like parts throughout the views and in which:

FIG. 5 is an enlarged top plan view of the cross member engagement with a longitudinal rail including parts broken away for the sake of clarity;

FIG. 8 is a perspective view of a modified rail construction according to the present invention;

FIG. 9 is a perspective view of an attachment combined with the article carrier structure of the present invention with portions of the carrier removed for clarity of the attachment; and FIG. 10 is a sectional elevational view of an article carrier incorporating the apparatus of FIG. 9.

DETAILED DESCRIPTION OF THE PREFERRED EMBODIMENT

Figure 1:
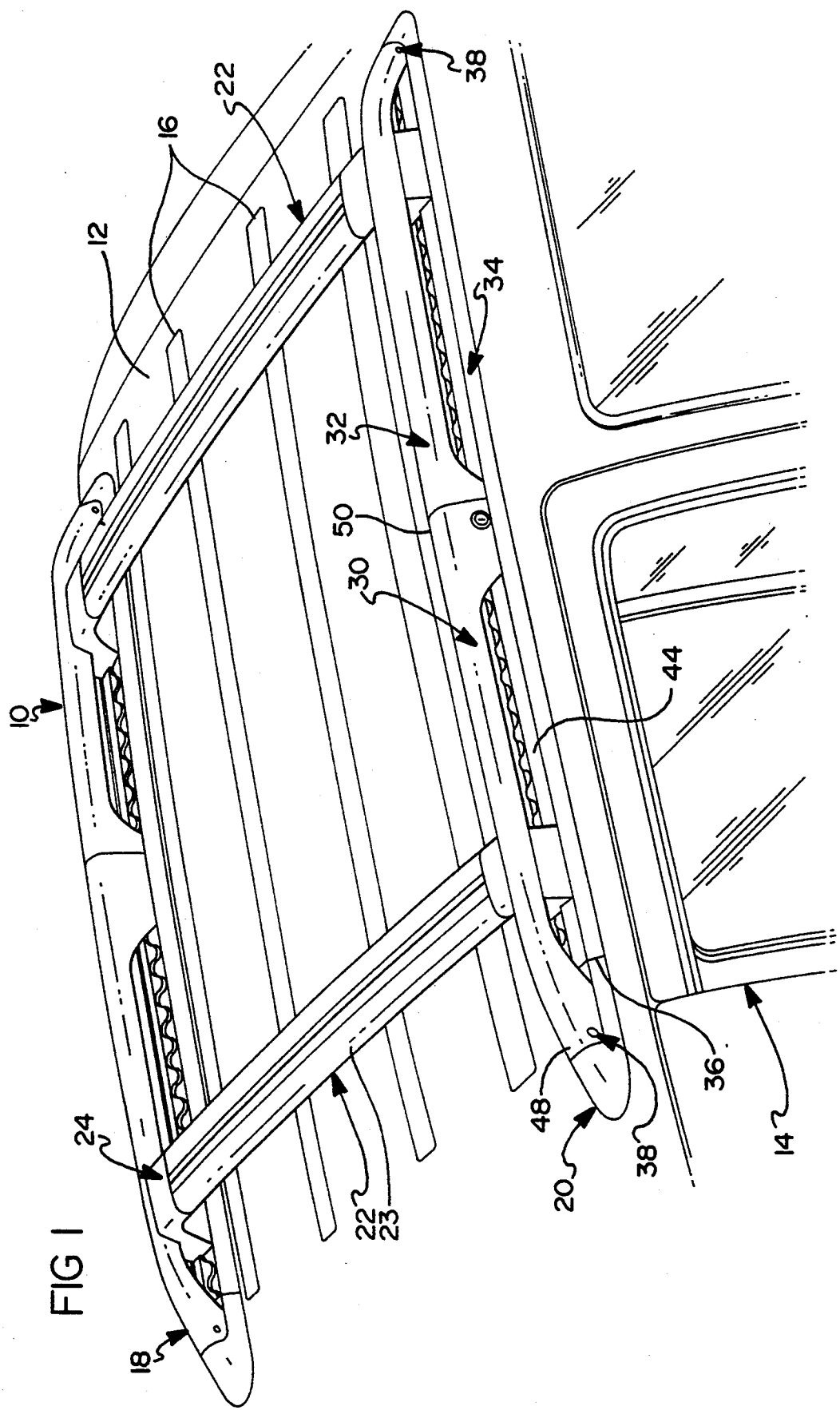
FIG. 1 is a perspective view of an article carrier mounted to a motor vehicle in accordance with the present invention.

Referring first to FIG. 1, an article carrier 10 according to the present invention is there secured to roof panel 12 of a motor vehicle 14. The carrier rails 18 and 20 secured by rivnuts and screws as is well known for mounting vehicle carriers to the panel 12, although other forms of attachment are also applicable without departing from the scope of the present invention. Of course, the particular vehicle and the particular body panels to which the carrier 10 is mounted may also be varied without departing from the scope of the present invention. In any event, article carrier 10 is also combined with additional support strips 16 laid across and secured by screws or adhesives as is conventional for support strips to the roof panel 12 intermediate the rails 18 and 20 to prevent abrasion between any cargo carried on the carrier 10 and the finished surface of the vehicle panel 12.

The rails 18 and 20 are aligned in parallel, registering positions so as to engage the ends of at least one or more elongated crossbars 22. The rails 18 and 20 may be identical, but are identified by separate reference characters to demonstrate that they may differ stylistically. For example, compatible or mirror image left hand and right hand stylings, but function similarly. Each longitudinal end 24 of each crossbar 22 is configured to correspond or mate with the rails 18 and 20, as will be described in greater detail hereinafter, to provide a fixed but adjustable position for the crossbar 22 between the rails 18 and 20. For example, a tubular member 23 made of roll formed or extruded metal, or injection or blow molded plastic, may be carried between the ends of molded, step-shaped ends 24 of cast metal or molded plastic as shown in FIG. 1.

Each of the rails 18 and 20 shown in FIG. 1 include upper arms 30 and 32 carried on a lower arm 34. The lower arm 34 may be made in one piece or in several pieces as designated by the truncation line 36 in FIG. 1. In any event, each upper arm 30 and 32 is pivotally secured to the lower arm 34. As shown in FIG. 1, the upper members 30 and 32 are hingedly secured at opposite longitudinal ends of the lower member 34 by hinges 38.

Figure 2:
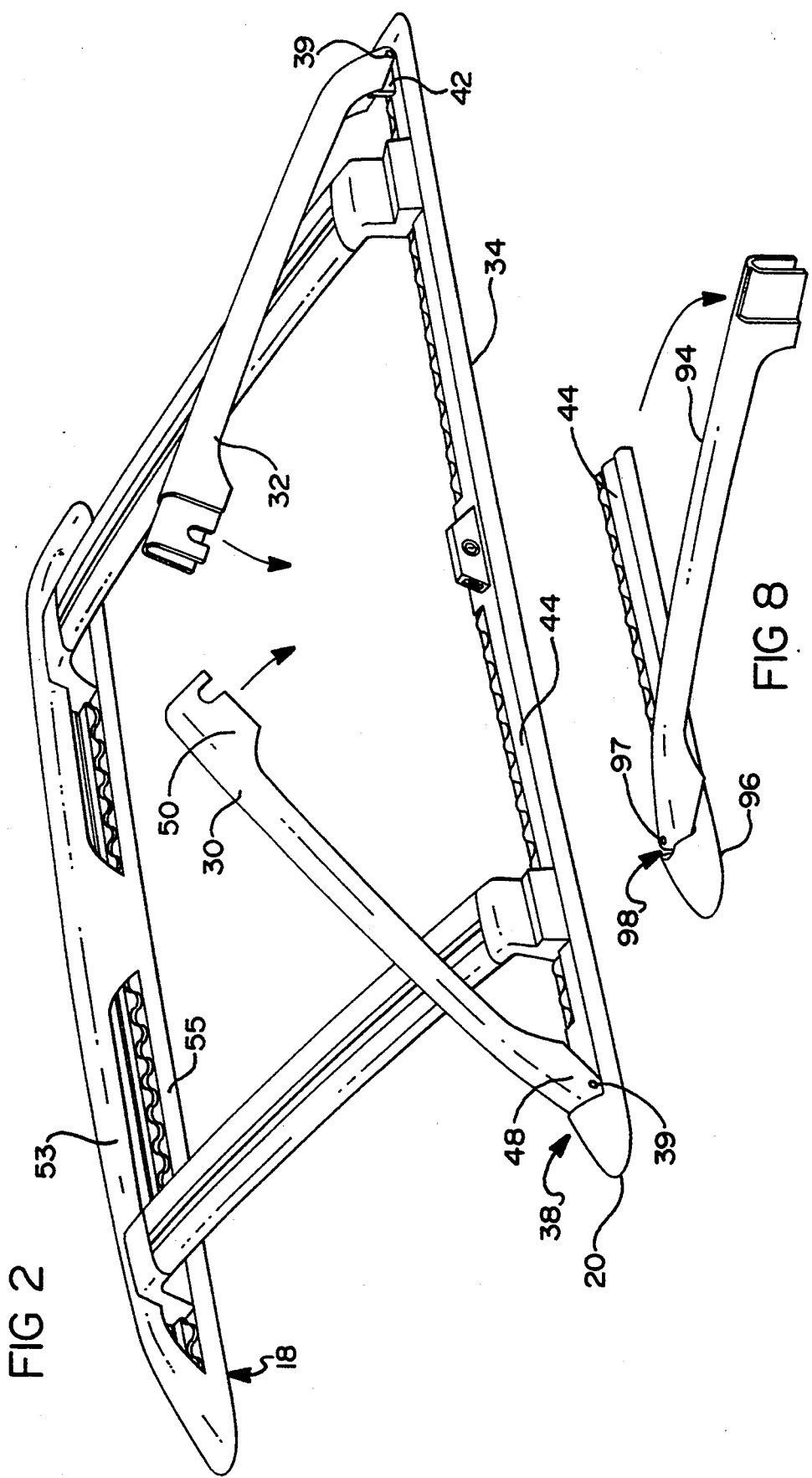
FIG. 2 is a perspective view similar to FIG. 1 but showing the upper arms of one rail in an open position, and a modified rail structure according to the present invention.

As best shown in FIG. 2, the hinge 38 in the embodiment of FIGS. 1 and 2 comprises a hinge pin 39 aligned on a transverse axis. The pin extends through registering apertures in each of the upper arms 30 and 32, as well as through apertures in the hinge pin support 42 extending upwardly from the mating surface 44 of the lower arm 34. A latch mechanism 46 secures the upper arms 30 and 32 to the lower arm 34 in a spaced position to receive the ends 24 of the crossbars 22 between the upper arm 30 and lower arm 34. For example, the hinge end 48 and the latching end 50 of the arm 30 include raised walls that elevate the intermediate portion of the arm 30 to a spaced position above the mating surface 44 of the lower arm 34.

The rails 18 and 20 may also be made of different constructions, for example, as shown in FIG. 2. The rail 18 in FIG. 2 includes upper and lower arms 53 and 55 which are secured together in spaced apart position to receive the crossbar end 24. Such a structure may be formed in one piece as shown, or formed by an assembly of multiple parts. Conversely, the member 20 is constructed in the manner shown in FIG. 1, with the upper arms 30 and 32 shown in their open position.

Figure 3:
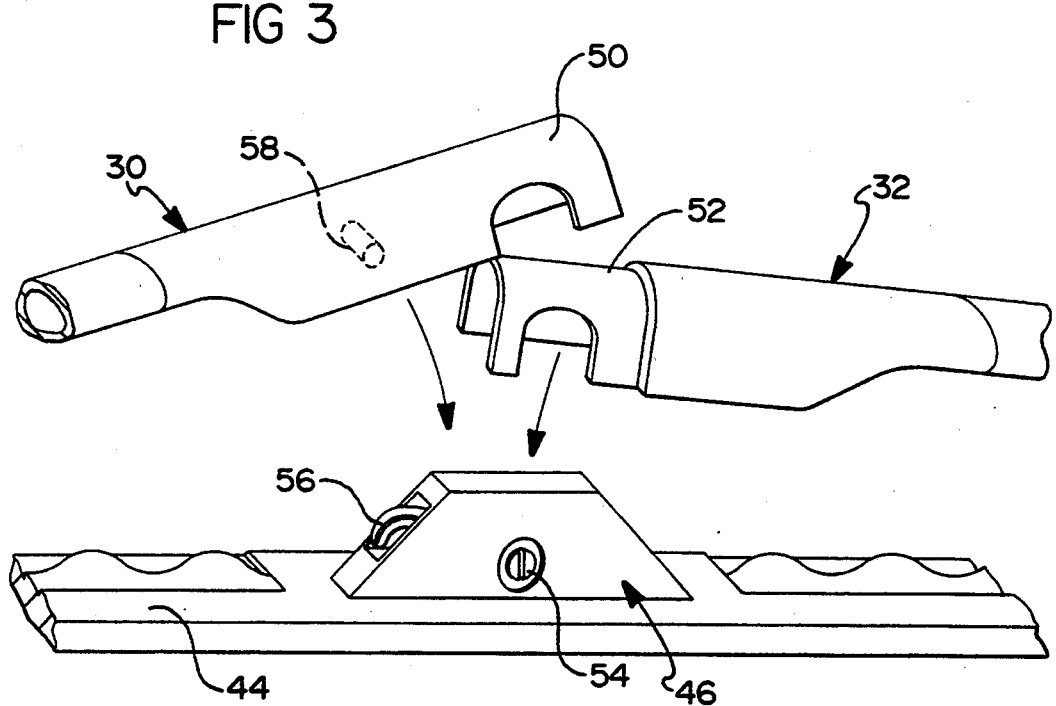
FIG. 3 is an enlarged, fragmented, exploded view of a portion of the apparatus shown in FIG. 1.

As best shown in FIG. 3, the latch end 50 of the upper arm 30 and the latch end 52 of the upper arm 32 include overlapping portions that may be closed against the latch mechanism 46. The latch mechanism may be of conventional construction, and preferably includes a key actuated lock cylinder 54 that displaces a spring loaded latch 56 which resiliently engages a pin 58 carried within the tunnel-shaped locking end 50 of arm 30. Preferably, the key access opening faces outwardly from the vehicle. Nevertheless, the locking mechanism may also be separate from the latching mechanism which holds the upper arms in the closed position.

Figure 4:
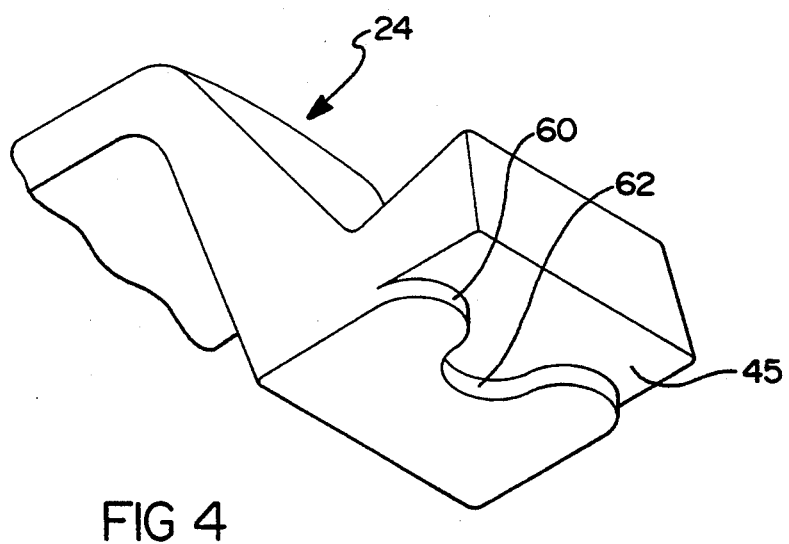
FIG. 4 is an enlarged perspective view of a portion of a cross member shown in FIG. 1.

As best shown in FIG. 4, each end 24 of a crossbar 22 includes a mating surface 45 corresponding to a configured surface of the longitudinal rail 18 or 20. For example, in the embodiment shown in FIG. 1 the upper surface of the lower member 34 is configured with alternating protrusions and valleys extending transversely across the surface, and lower surface 45 of the end 24 includes a corresponding and complementary configuration designated by the protrusions 60 and the valley 62 which serve to mate with the corresponding configurations on the surface 44. The complementary interengagement of these surfaces and the interengagement of the protrusions and valleys along the mating surfaces of both the longitudinal rail 20 and the crossbar fixedly positioned the crossbar 22 longitudinally along the rail 18 or 20. Nevertheless, it will be understood that mating surfaces between the crossbar 22 and the longitudinal rails may be provided in another manner for example, along the upper surface of the crossbar 22 and the lower surface of the upper arm 30. Nevertheless, the illustrated embodiment is preferred because the crossbar 22 may be held in a fixed position by gravity as the upper member of the rail is being closed to its spaced apart position from its open position.

Figure 6:
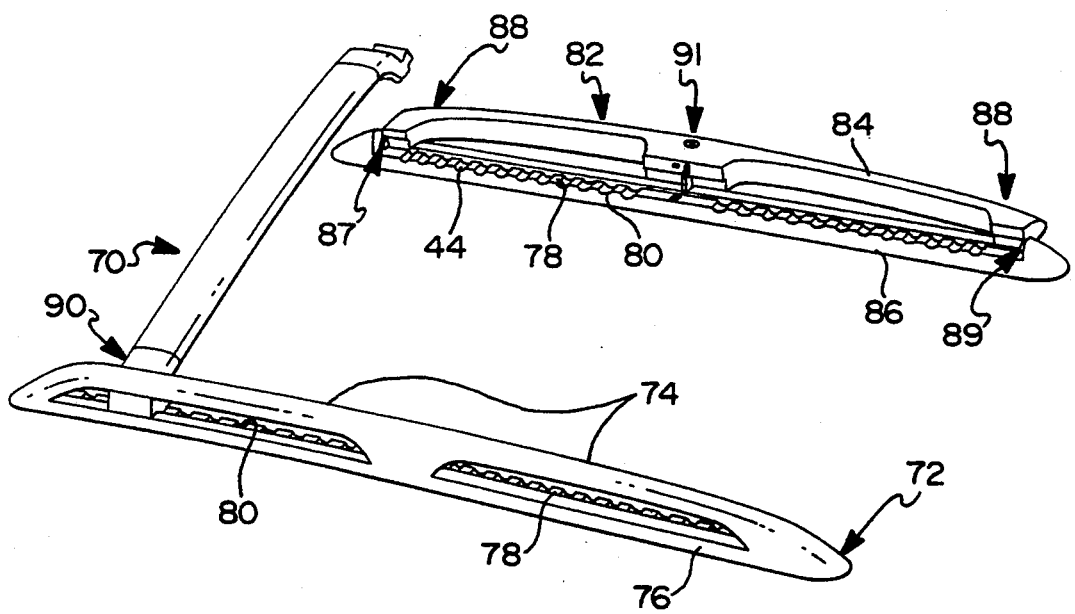
FIG. 6 is a perspective view of modified article carrier constructed in accordance with the present invention showing a longitudinal rail in a first operative position.
Figure 7:
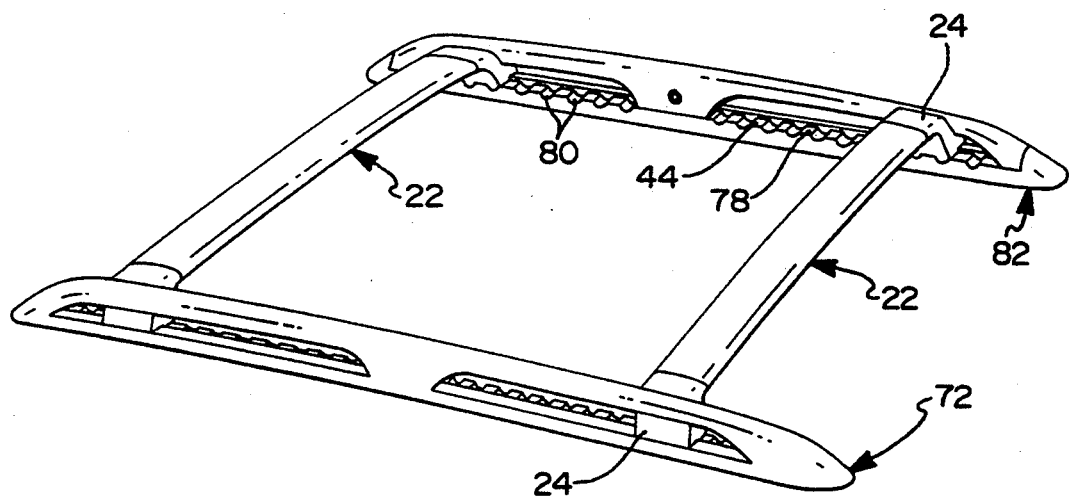
FIG. 7 is a perspective view similar to FIG. 5 but showing one longitudinal rail in a second operative position.

Referring now to FIGS. 6 and 7, an article carrier 70 according to the present invention is thereshown employing several modifications of the rails and crossbar structures which do not part from the scope of the present invention. In particular, a longitudinal rail 72 is made in one piece with raised upper arm portions 74 secured above a lower arm portion 76 adapted to receive the end 24 of the crossbar 22. However, the mating surface 44 of the lower portion 76 and the mating surface 45 of the end 24 include vertical protrusions 78 and valleys 80 corresponding to each other for fixedly positioning a crossbar 22 longitudinally along the rails 72 and 82.

The rail 82 comprises an injection molded upper arm 84 secured to an injection molded lower arm 86 by hinge 88. The preferred configuration of hinge 88 includes pivots located at the front and the rear of the longitudinal rail 82. Preferably, the pivots are formed with hinge pins that secure overlapping parts 87 and 89 of arm portions 82 and 84, respectively, with overlapping parts of lower arm 86 by passing through longitudinal pivot holes registering with each other in the overlapping parts. It will be readily understood that the hinge 88 has a longitudinal hinge axis so that the upper arm 84 pivots laterally away from the mating surface 44 of the lower member 86. As a result, one end 24 of crossbar 22 as shown at 90 in FIG. 6, is slid transversely into the spacing between the upper arm 74 and the lower arm 76 of rail 72 so that the mating surfaces 44 and 45 correspondingly engage each other and entrain the crossbar end 24 within the rail 72. The crossbar 22 is then pivoted downwardly toward rail 82 onto the mating surface 44 so that the conforming surfaces fix the longitudinal position of the crossbar 22 with respect to the longitudinal rails 72 and 82. After positioning of the crossbar 22, the upper arm 84 is then pivoted to its closed position as shown in FIG. 7 to entrain the crossbars 22 in the fixed positions as shown in FIG. 7. As with the previous embodiment, a latch mechanism 91, preferably a latch similar to 46 shown in FIG. 3, may be employed in this embodiment.

As shown in FIG. 8, it will also be seen that the relationship between the upper arm and the lower arms of the longitudinal rails may be modified so that a hinge 98 pivots an upper arm 94 with respect to a lower arm 94 in a lateral direction about a vertical hinge axis as provided, for example, by hinge pin 97. In any event, the lower arm 96 and the upper arm 94 are supported in spaced apart positions so as to receive the ends 24 of crossbars 22. In any event, the mating surfaces on the crossbar and the longitudinal rail include conforming configurations, such as the vertical or transverse undulating surfaces shown in the other Figures, so as to permit adjustable but fixed positioning of the crossbars with respect to the longitudinal rails.

As shown in FIG. 9, a pair of crossbars 22 may be used to support a grid 100 intermediate the longitudinal rails. The grid 100 comprises a plurality of crossing wire members 104 and 106, and preferably including perimeter support wire 102. The grid 100 is secured to mounts 108 by a mechanical or integral engagement. For simplicity, screws 109 and clamps 107 are shown, although other forms of fastening such as a snap-fit grooves in the mount 108 that receives the wire are contemplated. The mounts have a channel 110 adapted to receive the body of the crossbar 22 to entrain the grid 100 in a fixed position between the crossbars 22. Of course, removal of the crossbars 22 in a manner previously discussed also removes the grid 100 from the article carrier 10 or 70.

Referring now to FIG. 10, a retainer bar 112 constructed in accordance with the present invention is used in conjunction with the grid 100 to lock articles onto the article carrier according to the present invention, for example, article carriers 10 or 70 discussed previously. The retainer bar 112 includes an elongated body having a body length less than the spacing between the longitudinal rails 18 and 20. One end of the body includes an end 24 such as that employed in supporting the crossbar 22. As shown in FIG. 8, the end 24 is entrained between upper and lower arms of the longitudinal rail in a manner previously discussed. The other end of the retainer bar 112 includes a hook 116 which loops around a wire 104 or 106 through openings in the grid 100 to restrict displacement of the bar 112 above the upper surface of the grid 100. As a result, the retainer bar 112 is particularly well adapted for securing parcels onto the grid 100 supported intermediate the crossbars 22. For example, as shown in FIG. 10, a pair of skis 118 are shown pressed between the grid 100 and a resilient layer 120 carried on the body of the bar 112. Moreover, by hooking the end 116 around a wire of the grid 100, the other end 24 is easily positioned on the lower arm of the longitudinal rail before hingedly closing the upper arm of the rail about the hinge axis as previously discussed.

Having thus described the present invention, many modifications thereto will become apparent to those skilled in the art to which it pertains without departing from the scope and the spirit of the present invention as defined in the appended claims.

We claim:

1. A luggage carrier comprising:
    a pair of transversely spaced, parallel rails, each rail having an upper arm, a lower arm registering with said upper arm and a support positioning said upper arm at a spaced position above said lower arm;
    at least one crossbar extending transversely across said rails, each said crossbar having first and second ends, each end dimensioned to be received between said upper and lower arms of said rails such that said ends do not extend beyond the rails;
    wherein at least one rail includes a hinge coupling said upper arm to said lower arm for pivotal movement to and from said spaced position to an open position; and
    wherein said at least one rail includes a latch for releasably latching said upper arm in said spaced position.

2. The invention as defined in claim 1 wherein said at least one rail includes a second upper arm and a second hinge coupling said second upper arm to said lower arm for pivotal movement to and from said spaced position to an open position.

3. The invention as defined in claim 2 wherein each said hinge has a transverse hinge axis transverse to the length of said at least one rail pivotally securing a first end of each said upper arm to said lower arm.

4. The invention as defined in claim 3 wherein said each upper arm has a second end opposite said hinge axis wherein said second ends overlap each other in said spaced position.

5. The invention as defined in claim 1 wherein said hinge has a vertical hinge axis pivotally securing said upper arm to said lower arm.

6. The invention as defined in claim 1 wherein each said end includes one of a protrusion and a complementary groove and each said rail includes the other of said protrusion and said complementary groove.

7. The invention as defined in claim 6 wherein each said rail includes a plurality of said other of said protrusion and complementary groove.

8. The invention as defined in claim 6 wherein said protrusion is transversely aligned with respect to said rails.

9. The invention as defined in claim 7 wherein said protrusion is transversely aligned with respect to said rails.

10. The invention as defined in claim 6 wherein said protrusion is vertically aligned with respect to said rails.

11. The invention as defined in claim 7 wherein said protrusion is vertically aligned with respect to said rails.

12. The invention as defined in claim 1 wherein said hinge has a longitudinal hinge axis parallel to the length of said at least one rail.

13. The invention as defined in claim 1 wherein said hinge has a vertical hinge axis.

14. The invention as defined in claim 1 wherein said hinge has a transverse hinge axis transverse to the length of said at least one rail.

15. The invention as defined in claim 1 and further comprising a second crossbar having first and second ends dimensioned to be received between said upper and lower arms of said rail;
   a grid; and
   mounts adapted to be in connection with said crossbars for securing the grid intermediate the first and second crossbars.

16. A luggage carrier of the type that receives a crossbar, said carrier comprising:
   a crossbar having opposite first and second ends;
   a pair of transversely spaced, parallel rails, each rail having an upper arm, a lower arm registering with said upper arm and a support positioning said upper arm at a spaced position above the lower arm;
   wherein both of said ends of said crossbar include one of a protrusion and a complementary groove and each said lower rail includes the other of said protrusion and said complementary groove;
   said crossbar being transversely aligned with said rails such that one of said protrusion and said complementary groove on each end of said crossbar respectively mates with the other of said protrusion and complementary groove on each said lower arm of said rails;
   wherein at least one rail includes a hinge coupling said upper arm to said lower arm for pivotal movement to and from said spaced position to an open position; and
   wherein said at least one rail includes a latch for releasably latching said upper arm in said spaced position.

17. A luggage carrier comprising:
   a pair of transversely spaced, parallel rails, each rail having an upper arm, a lower arm registering with said upper arm and a support positioning said upper arm at a spaced position above said lower arm;
   at least one crossbar extending transversely across said rails, each said crossbar having first and second ends, each end dimensioned to be received between said upper and lower arms of said rails;
   wherein at least one rail includes a hinge coupling said upper arm to said lower arm for pivotal movement to and from said spaced position to an open position;
   wherein said at least one rail includes a latch for releasably latching said upper arm in said spaced position;
   a second crossbar having first and second ends dimensioned to be received between said upper and lower arms of said rail;
   a grid;
   mounts adapted to be in connection with said crossbars for securing the grid intermediate the first and second crossbars; and
   a retainer bar having an elongated body shorter than the space between said rails, a first end dimensioned to be received between said upper and lower arms of one of said rails, and a hook for interlocking with the grid at the opposite end of said elongated body.

* * * * *